United States Patent
Chen

(10) Patent No.: US 12,304,278 B2
(45) Date of Patent: May 20, 2025

(54) AIR MONITORING SYSTEM FOR VEHICLE INTERIOR

(71) Applicant: Ford Global Technologies, LLC, Dearborn, MI (US)

(72) Inventor: Jay Z. Chen, Sylvania, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 319 days.

(21) Appl. No.: 17/746,348

(22) Filed: May 17, 2022

(65) Prior Publication Data
US 2023/0373269 A1  Nov. 23, 2023

(51) Int. Cl.
| | |
|---|---|
| *B60H 1/00* | (2006.01) |
| *G01N 15/00* | (2024.01) |
| *G01N 15/0205* | (2024.01) |
| *G01N 15/06* | (2024.01) |
| *G01N 15/075* | (2024.01) |

(52) U.S. Cl.
CPC ......... *B60H 1/008* (2013.01); *G01N 15/0205* (2013.01); *G01N 15/06* (2013.01); *G01N 2015/0046* (2013.01); *G01N 15/075* (2024.01)

(58) Field of Classification Search
CPC ........ B60H 1/008; G01N 15/01; G01N 15/06; G01N 15/075; G01N 15/0612; G01N 2015/03; G01N 2015/0046; G01N 21/27; G01N 15/0205

See application file for complete search history.

(56) References Cited

U.S. PATENT DOCUMENTS

| | | |
|---|---|---|
| 6,711,470 B1 | 3/2004 | Hartenstein et al. |
| 7,053,783 B2 | 5/2006 | Hamburger et al. |
| (Continued) | | |

FOREIGN PATENT DOCUMENTS

WO  2019186527 A1  10/2019

OTHER PUBLICATIONS

Wen Jing, Wang Zhao, Sixiu Liu, Lin Li, Chie-Tay Tsai, Xiaoyong Fan, Wenjuan Wu, Jingyan Li, Xin Yang, and Guodong Sui, Microfluidic Device for Efficient Airborne Bacteria Capture and Enrichment, Analytical Chemistry, 2013, pp. 5255-5262, ACS Publications, 2013 American Chemical Society.

*Primary Examiner* — Tarifur R Chowdhury
*Assistant Examiner* — Akbar H. Rizvi
(74) *Attorney, Agent, or Firm* — Vichit Chea; Price Heneveld LLP

(57) ABSTRACT

A vehicle air monitoring system includes a housing defining an interior and an inlet. An airflow assembly is disposed within the interior and includes a pump configured to draw an air sample into an airflow passage via the inlet. A detection assembly is in fluid communication with the airflow passage of the airflow assembly. The detection assembly includes a light source configured to illuminate a biochip and a photodetector configured to detect an optical transmission of the biochip based on a photocurrent of the photodetector. A control assembly is in communication with the airflow assembly and the detection assembly. The control assembly is configured to activate the pump to draw the air sample into the airflow passage, compare the photocurrent by the photodetector with a predefined baseline photocurrent to determine a change in the optical transmission of the biochip, and communicate particle data to a remote device.

20 Claims, 13 Drawing Sheets

(56) References Cited

U.S. PATENT DOCUMENTS

| | | |
|---|---|---|
| 9,688,194 B2 | 6/2017 | MacNeille et al. |
| 10,222,360 B1 | 3/2019 | Nourbakhsh et al. |
| 2005/0074784 A1* | 4/2005 | Vo-Dinh ............ G01N 21/6428 |
| | | 435/7.1 |
| 2005/0136507 A1 | 6/2005 | Sullivan et al. |
| 2008/0241909 A1 | 10/2008 | Jung et al. |
| 2013/0314528 A1* | 11/2013 | Ozanam ................ G02B 21/16 |
| | | 348/79 |
| 2014/0073043 A1* | 3/2014 | Holmes ................ G01N 35/00 |
| | | 435/287.3 |
| 2022/0214328 A1* | 7/2022 | Agabi ............... B01L 3/502715 |

\* cited by examiner

AIR MONITORING SYSTEM FOR VEHICLE INTERIOR

FIELD OF THE DISCLOSURE

The present disclosure generally relates to an air monitoring system. More specifically, the present disclosure relates to an air monitoring system for a vehicle interior.

BACKGROUND OF THE DISCLOSURE

Vehicles generally have interior compartments where air may be directed or recirculated. The air may be monitored for various particles.

SUMMARY OF THE DISCLOSURE

According to at least one aspect of the present disclosure, a vehicle air monitoring system includes a housing defining an interior. The housing defines an inlet. An airflow assembly is disposed within the interior of the housing and includes a pump configured to draw an air sample into an airflow passage via the inlet. A detection assembly is in fluid communication with the airflow passage of the airflow assembly. The detection assembly includes a light source configured to illuminate a biochip and a photodetector configured to detect an optical transmission of the biochip based on a photocurrent of the photodetector. A control assembly is in communication with the airflow assembly and the detection assembly. The control assembly is configured to activate the pump to draw the air sample into the airflow passage, compare the photocurrent by the photodetector with a predefined baseline photocurrent to determine a change in the optical transmission of the biochip, and communicate particle data to a remote device.

According to another aspect of the present disclosure, an air monitoring system for a vehicle includes a housing. An airflow assembly is disposed within the housing and is configured to draw an air sample into the housing via an inlet. A detection assembly is disposed within the housing and is in fluid communication with the airflow assembly. The detection assembly includes a biochip configured to bind to select airborne particles. The detection assembly includes a light source configured to illuminate the biochip and a photodetector. A photocurrent of the photodetector is configured to correspond with an optical transmission of the biochip. A controller is configured to monitor the change in the optical transmission of the biochip based on the change of the photocurrent of the photodetector to determine a presence of the select airborne particles within the air sample.

According to another aspect of the present disclosure, a method of monitoring air within a vehicle includes drawing an air sample into a housing via a pump; separating airborne particles from the air sample, the airborne particles being directed to a detection assembly; illuminating a biochip of the detection assembly; determining an optical transmission of the biochip based on a photocurrent of a photodetector; determining particle data for the air sample based on the optical transmission; and monitoring a change in the optical transmission of the biochip based on a change in the photocurrent.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
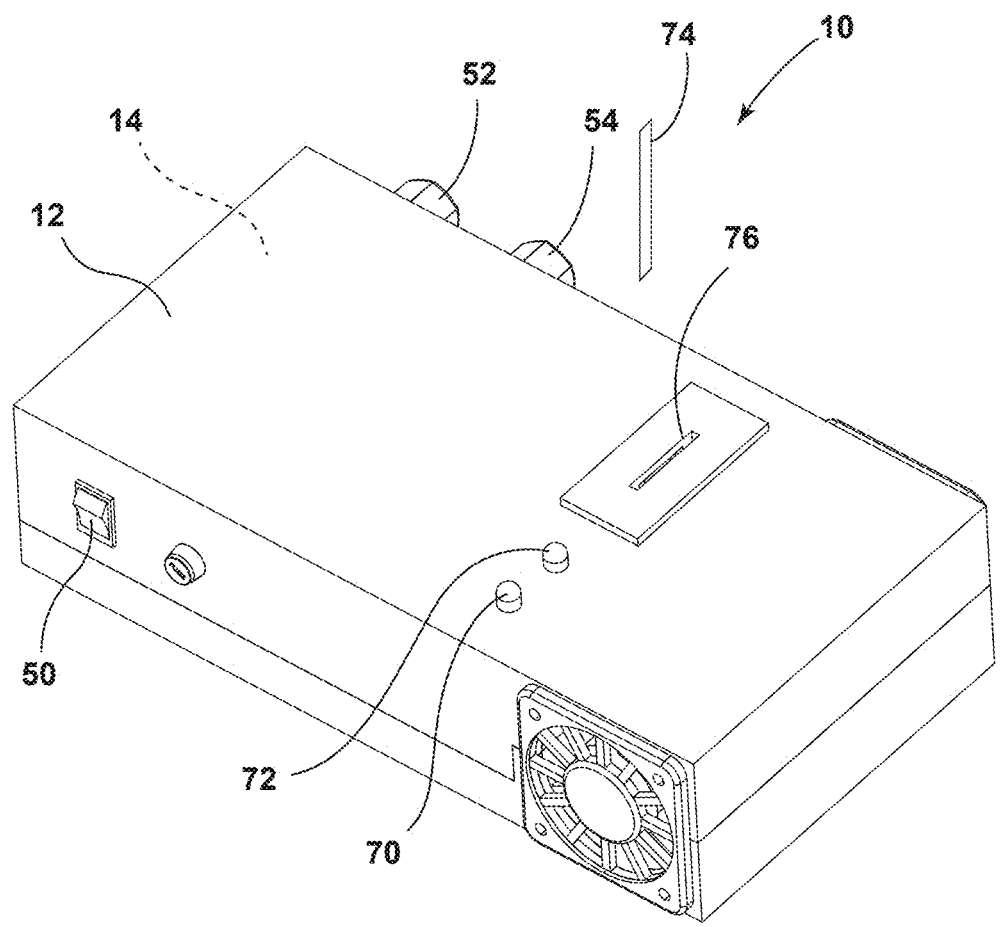
FIG. 1 is a side perspective view of an air monitoring system for a vehicle, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

With reference to FIGS. 1-13, reference numeral 10 generally designates a vehicle 60 air monitoring system 10 that includes a housing 12 defining an interior 14. The housing 12 defines an inlet 16 and an outlet 18. An airflow assembly 20 is disposed within the interior 14 of the housing 12. The airflow assembly 20 includes a pump 22 configured to draw an air sample into an airflow passage 24 via the inlet 16. A detection assembly 26 is in fluid communication with the airflow passage 24 of the airflow assembly 20. The detection assembly 26 includes a light source 28 configured to illuminate a biochip 30 and a photodetector 32 configured to detect an optical transmission of the biochip 30 based on a photocurrent of the photodetector 32. A control assembly 34 in the detection assembly 26 is in communication with the airflow assembly 20 in the detection assembly 26. The control assembly 34 is configured to activate the pump 22 to draw the air sample into the airflow passage 24, compare the photocurrent by the photodetector 32 with a predefined baseline photocurrent to determine a change in the optical transmission of the biochip 30, and communicate particle data 36 to a remote device 38.

Referring to FIG. 1, the air monitoring system 10 includes the housing 12, which is configured to seal the interior 14. The sealed interior 14 houses multiple assemblies for obtaining the air sample, collecting airborne particles from the air sample, detecting the airborne particles, and communicating particle data 36 (see FIG. 11) about the airborne particles and the air sample (e.g., presence, density, particle population, etc.). The housing 12 includes an activation switch 50 configured to adjust the air monitoring system 10 between an activated state and a deactivated state. The housing 12 also includes connectors 52, 54, which may be configured to electrically couple the air monitoring system 10 to a vehicle 60 (FIG. 10) or another system for collecting, analyzing, and/or monitoring the particle data 36.

The air monitoring system 10 includes two indicator lights 70, 72 coupled to the housing 12. The indicator lights 70, 72 may convey information to a user proximate to the air monitoring system 10. The indicator lights 70, 72 may be light-emitting diodes (LEDs) or any practicable light source. For example, the first indicator light 70 may be configured to emit blue light or be a blue light source. The first indicator light 70 may be activated when the air monitoring system 10 is processing the air sample, when the air sample has been analyzed and found to have no or minimal amounts of select airborne particles, when the airborne particles are below a predefined threshold, etc. The second indicator light 72 may be configured to emit red light or be a red light source. The second indicator light 72 may be configured to be activated when the air sample has been processed and select airborne particles are detected, when the airborne particles are at or above a predefined threshold, etc.

Referring still to FIG. 1, in certain aspects, the air monitoring system 10 may be configured to test air samples, as well as samples provided on a test strip sample 74. In such examples, the housing 12 defines a receiving slot 76, which is configured to receive the test strip sample 74 as discussed herein. The air monitoring system 10 may operate in different modes of operation to process the air sample compared to the test strip sample 74.

Figure 2:
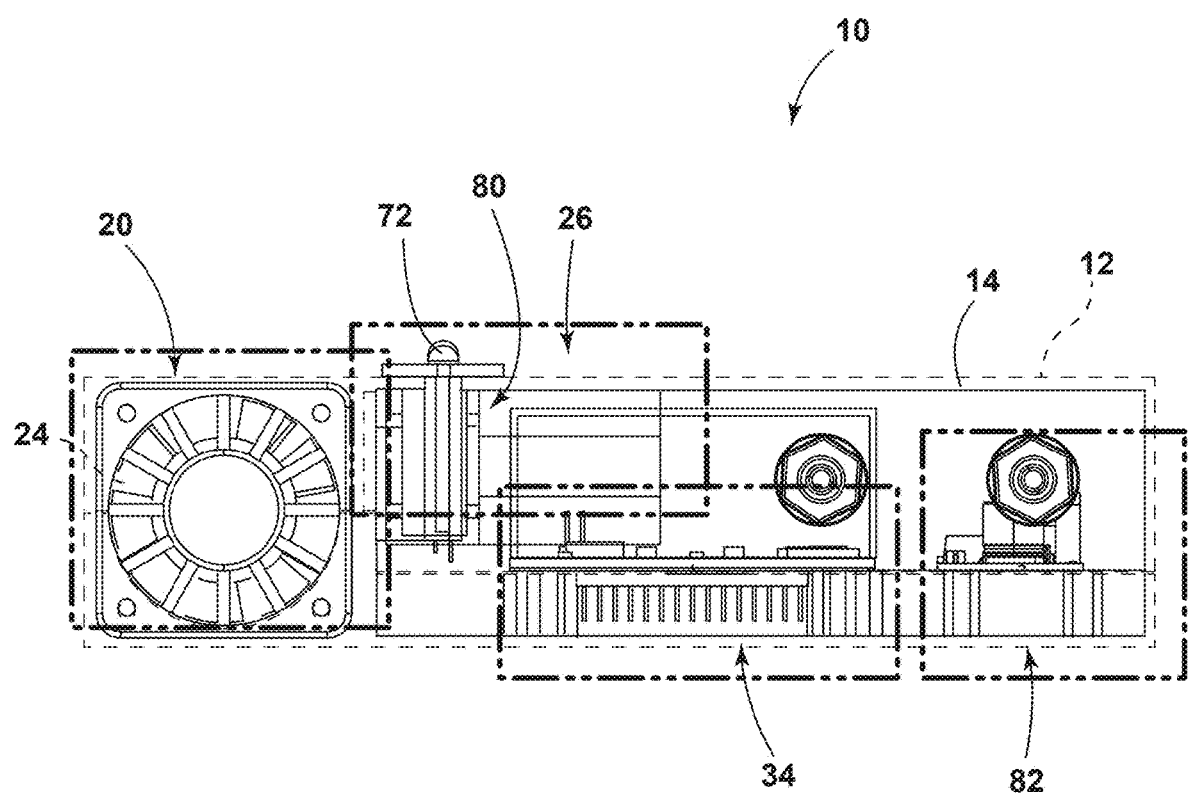
FIG. 2 is a side elevation view of an air monitoring system with a portion of a housing removed to show interior assemblies, according to the present disclosure.
Figure 3:
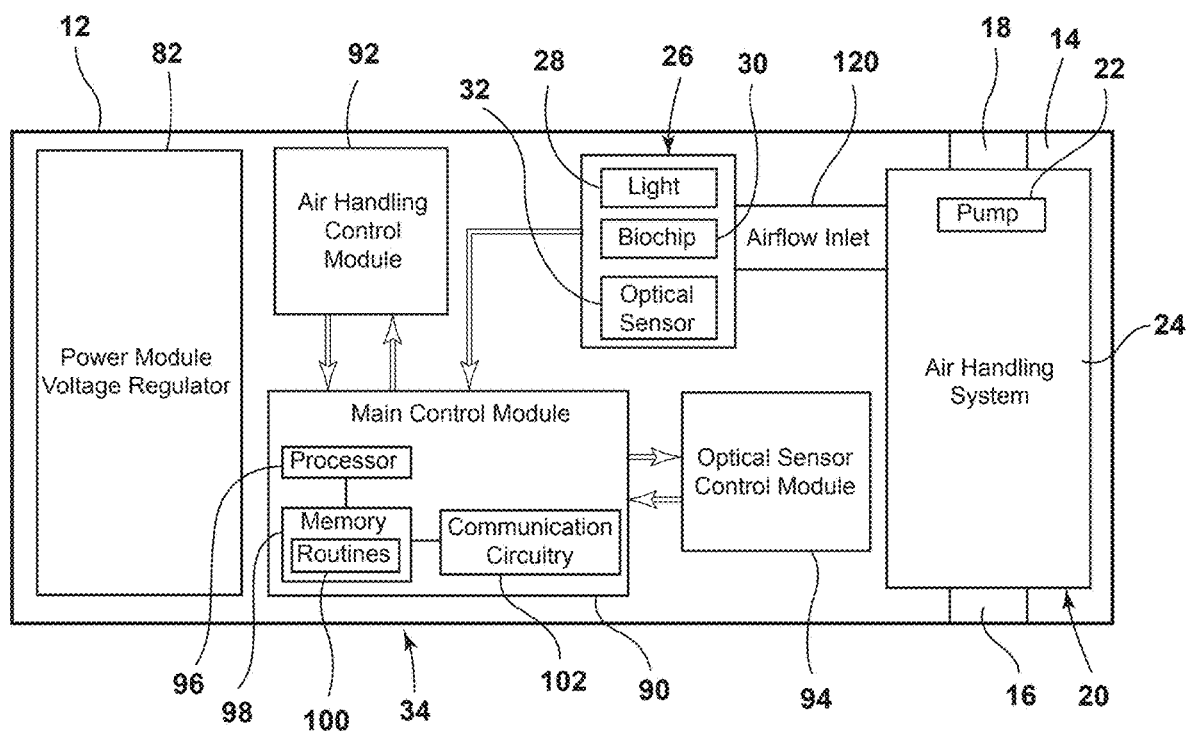
FIG. 3 is a box diagram of an air monitoring system for a vehicle, according to the present disclosure.

Referring to FIGS. 2 and 3, the air monitoring is configured as an integrated and self-contained system within the housing 12. The air monitoring system 10 includes the airflow assembly 20, the detection assembly 26 with a collection unit 80, a power unit 82, and the control assembly 34. The air monitoring system 10 is configured to be installed in a location to monitor airborne particles, such as airborne viral particles and other pathogens within the surrounding location. The power unit 82 may be a battery configured to power the air monitoring system 10 and may also include a voltage regulator.

The airflow assembly 20 is configured to draw the air sample into the air monitoring system 10. The airflow assembly 20 includes the pump 22, which draws air from outside the housing 12 into the airflow passage 24 of the airflow assembly 20. The airflow assembly 20 is in fluid communication with the detection assembly 26, which includes the collection unit 80. The airborne particles are configured to be separated from the air sample in the airflow assembly 20 and driven into the collection unit 80. The airborne particles are configured to be guided or directed from the collection unit 80 to the detection assembly 26 for analysis.

The detection assembly 26 includes the biochip 30, the light source 28, and the photodetector 32. The biochip 30 is configured to bind with select airborne particles. The binding of the biochip 30 with the airborne particles changes the optical transmission of the biochip 30, which is configured to be measured and detected by the photocurrent of the photodetector 32 when the light source 28 illuminates the biochip 30. Accordingly, the changes in the optical transmission of the biochip 30, consequently, change the photocurrent of the photodetector 32.

The control assembly 34 includes multiple control modules or controllers. For example, the control assembly 34 includes a primary controller 90, an air handling controller 92, and a sensor controller 94. The primary controller 90 is configured to communicate with the air handling controller 92, the sensor controller 94, and the photodetector 32. Each controller is configured to have a processor or microprocessor 96, a memory 98, and other control circuitry. Instructions or routines 100 are stored in the respective memories 98 and executable by the respective processor 96. Further, the primary controller 90 may include communication circuitry 102 configured for bidirectional wired or wireless communication.

Figure 4:
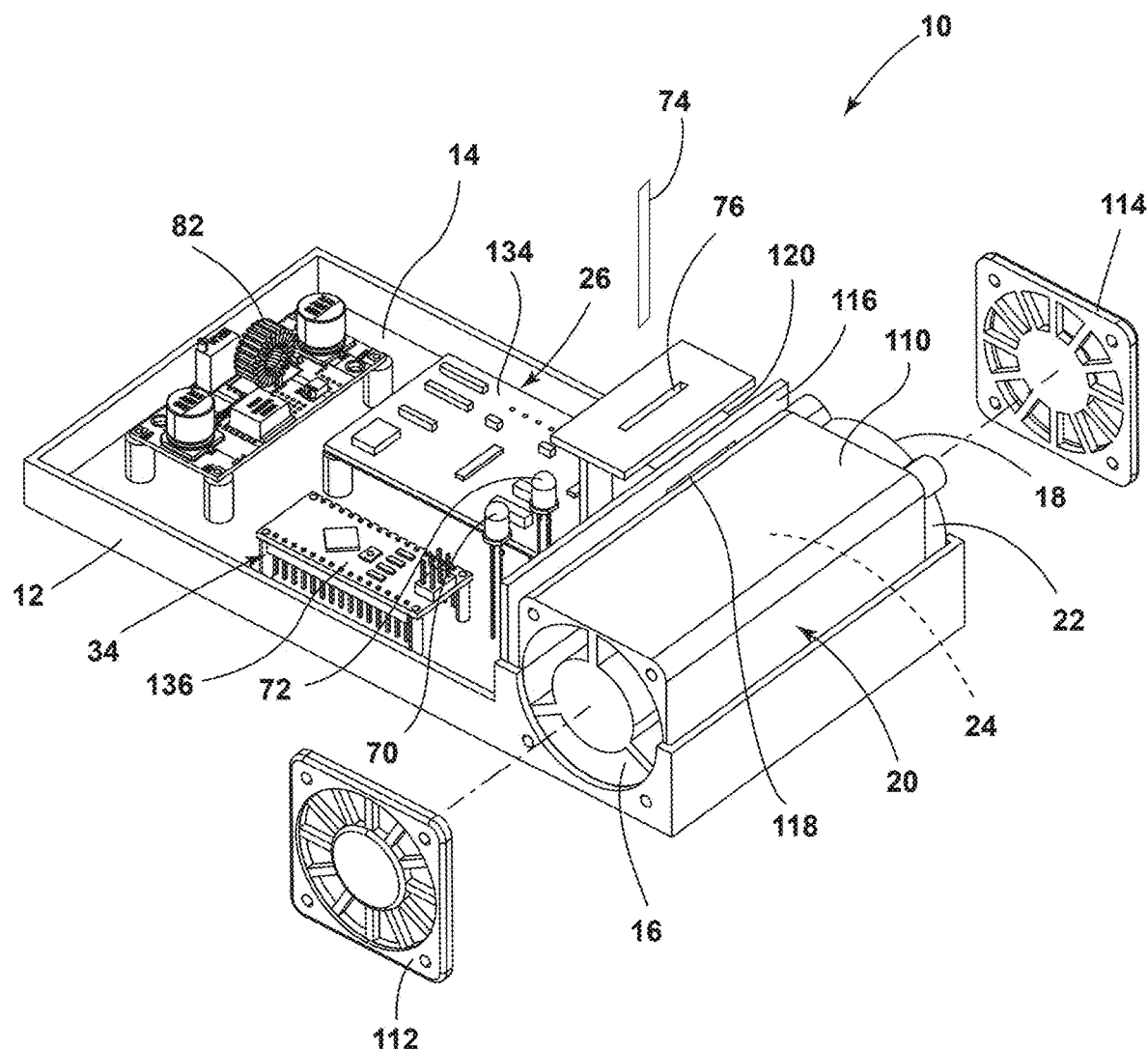
FIG. 4 is a partially exploded side perspective view of an air monitoring system with a portion of a housing removed, according to the present disclosure.
Figure 5:
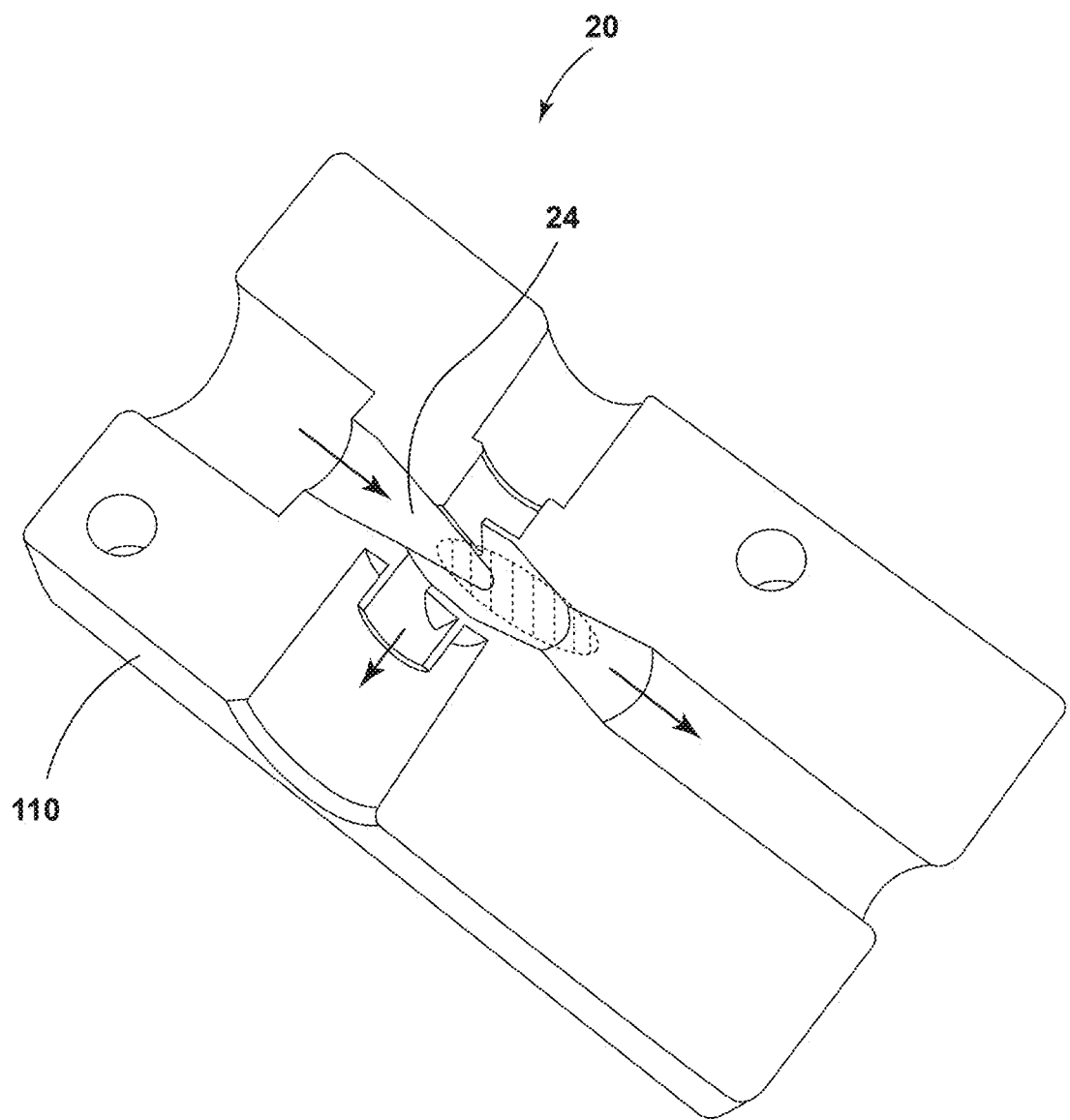
FIG. 5 is a partial top perspective view of an air passage of an airflow assembly for an air monitoring system, according to the present disclosure.

Referring to FIGS. 4 and 5, the airflow assembly 20 is configured to be activated and deactivated by the air handling controller 92 (FIG. 3). When activated, the airflow assembly 20 draws the air sample from the area surrounding the housing 12 to be tested by the air monitoring system 10. The airflow assembly 20 includes the pump 22, a conduit 110 defining the airflow passage 24, an inlet cover 112, and an outlet cover 114. The conduit 110 is generally configured as a tube extending through the housing 12 between the inlet 16 and the outlet 18. Accordingly, the airflow assembly 20 is configured to draw the air sample into the airflow passage 24 through the inlet 16 and expel the air sample out of the housing 12 via the outlet 18. In a specific non-limiting example, the pump 22 includes an electrical motor that creates a high-velocity airflow of about 100 m/sec, through the airflow assembly 20, creating a consistent negative pressure. The configuration of the airflow passage 24 may be adjusted based on a size of the air sample and a size of the air monitoring system 10. In a non-limiting example, the conduit 110 may be a tube that is about 80 mm by about 40 mm.

The housing 12 includes a retaining wall 116 for providing a space for the conduit 110. The retaining wall 116 may be advantageous to retain the conduit 110 in the select location within the housing 12 during operation of the pump 22, as well as maintaining the fluid communication with the collection unit 80. In various examples, the retaining wall 116 defines an aperture 118 for a connecting conduit 120 to fluidly couple the air passage with the collection unit 80.

The inlet cover 112 is coupled to the housing 12 over the inlet 16, while the outlet cover 114 is coupled to the housing 12 over the outlet 18. The inlet and outlet covers 112, 114 may assist in controlling the air being drawn into the airflow passage 24. Additionally or alternatively, the inlet and outlet covers 112, 114 may assist in preventing larger items from being drawn into the airflow assembly 20, which could affect the accuracy or function of the air monitoring system 10.

Generally, the airflow assembly 20 generates the consistent negative pressure as the air sample flows through the airflow passage 24. The air monitoring system 10 utilizes the Venturi effect to separate the airborne particles from the air sample flowing through the airflow passage 24. The Venturi effect describes how the velocity of a fluid increases as the cross-section decreases. As illustrated in FIG. 5, the cross-section of the airflow passage 24 may decrease to increase the velocity of the air sample through the airflow assembly 20. Through the pressure differential created by the Venturi effect, the airborne particles are driven out of the airflow passage 24 to a connecting conduit 120, which fluidly couples the airflow assembly 20 to the collection unit 80. It is contemplated that the air sample may pass through the collection unit 80 without apart from the teachings herein.

Figure 6:
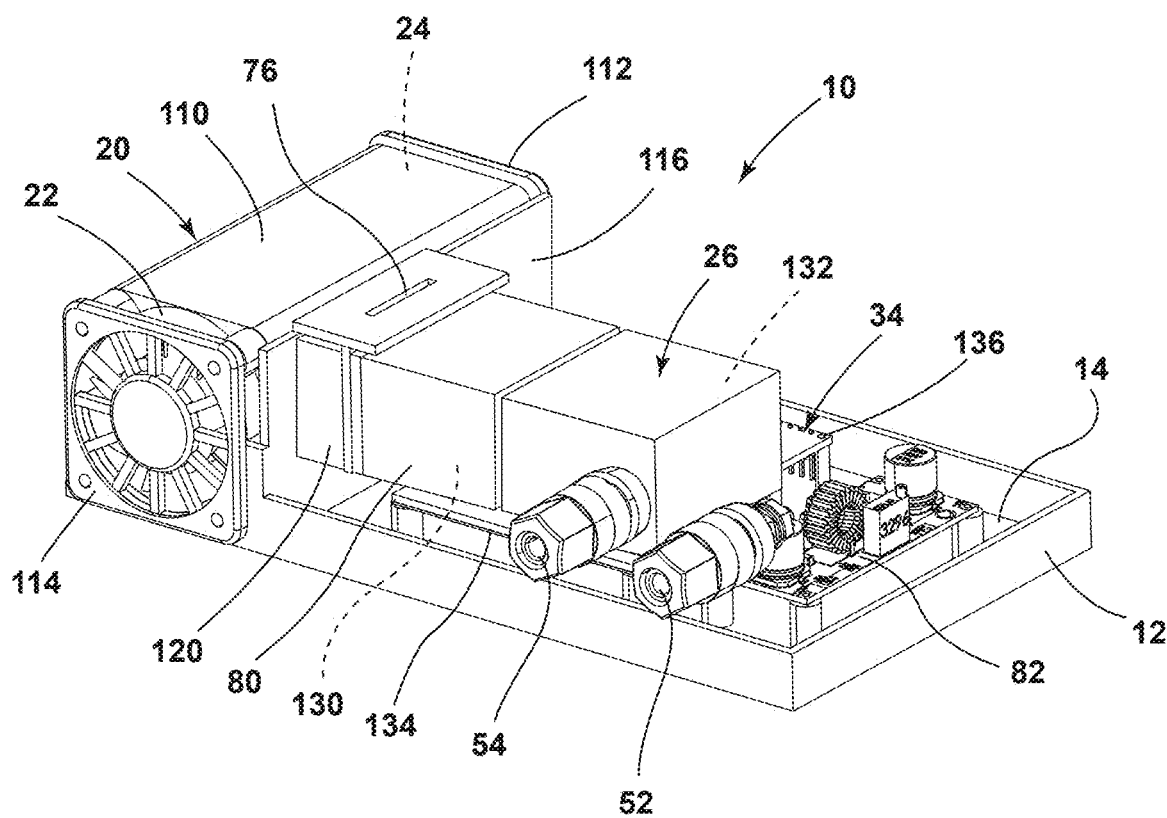
FIG. 6 is a side perspective view of an air monitoring system with a portion of a housing removed to illustrate a collection unit and a detection chamber, according to the present disclosure.
Figure 7:
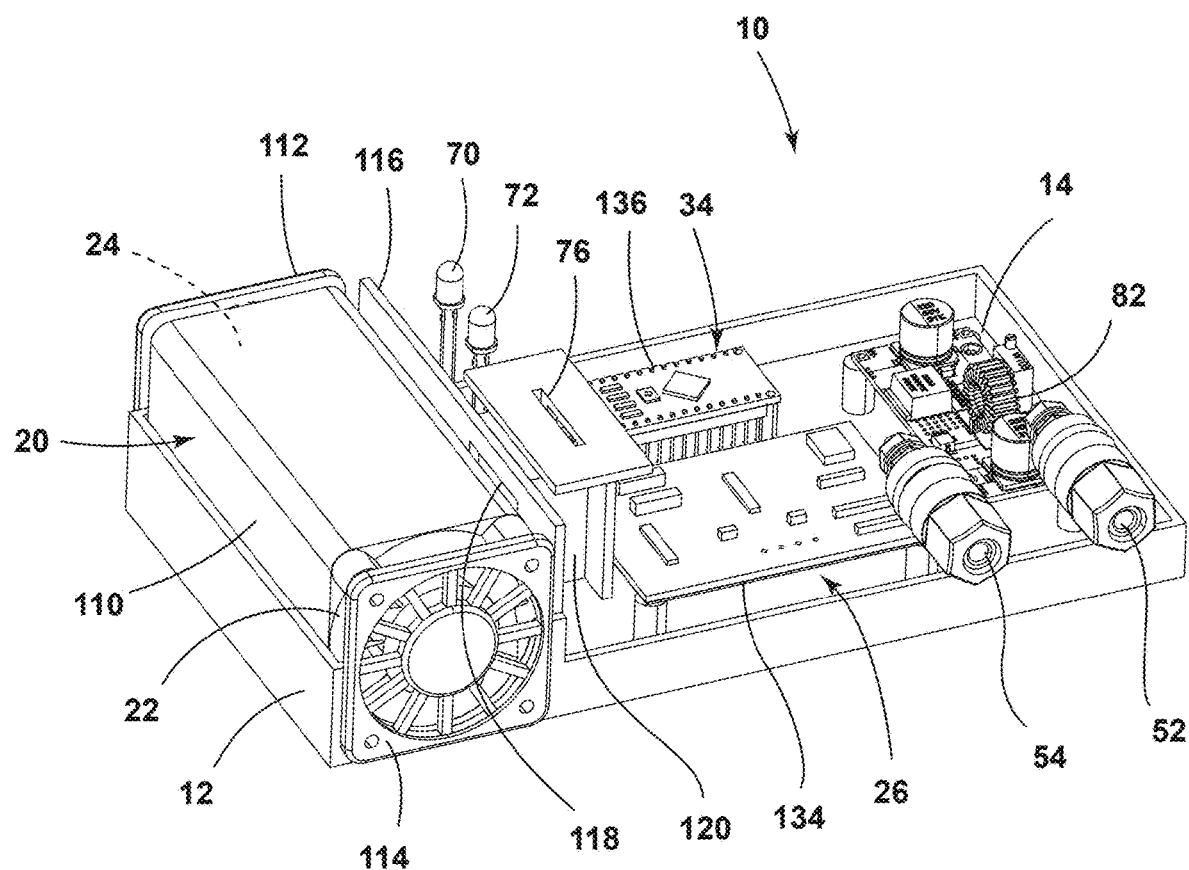
FIG. 7 is a side perspective view of an air monitoring system with a portion of a housing and a portion of a detection assembly removed, according to the present disclosure.

Referring to FIGS. 6 and 7, the collection unit 80 is utilized to collect the airborne particles. The collection unit 80 includes a collection chamber 130 for collecting the airborne particles. In a non-limiting example, the collection unit 80 includes a microfluidic particle trapping chamber 130, which is in fluid communication with the airflow passage 24. The collection unit 80 is also utilized for driving the airborne particles to the biochip 30 of the detection assembly 26 for analysis.

The detection assembly 26 may have a variety of configurations. For example, as illustrated in FIGS. 6 and 7, the detection assembly 26 includes the collection unit 80 in fluid communication with the airflow assembly 20 and a detection chamber 132, where the biochip 30, the light source 28, and the photodetector 32 are located. The collection unit 80 and the detection chamber 132 are arranged adjacent to one another and over a circuit board 134 for supporting the components of the detection assembly 26. In such examples, the control assembly 34, supported on an additional circuit board 136, is spaced from the board supporting the components of the detection assembly 26. It is contemplated that the circuit boards 134, 136 may be configured as flexible or rigid printed circuit boards 134, 136 or as one or more circuits without departing from the teachings herein.

Figure 8:
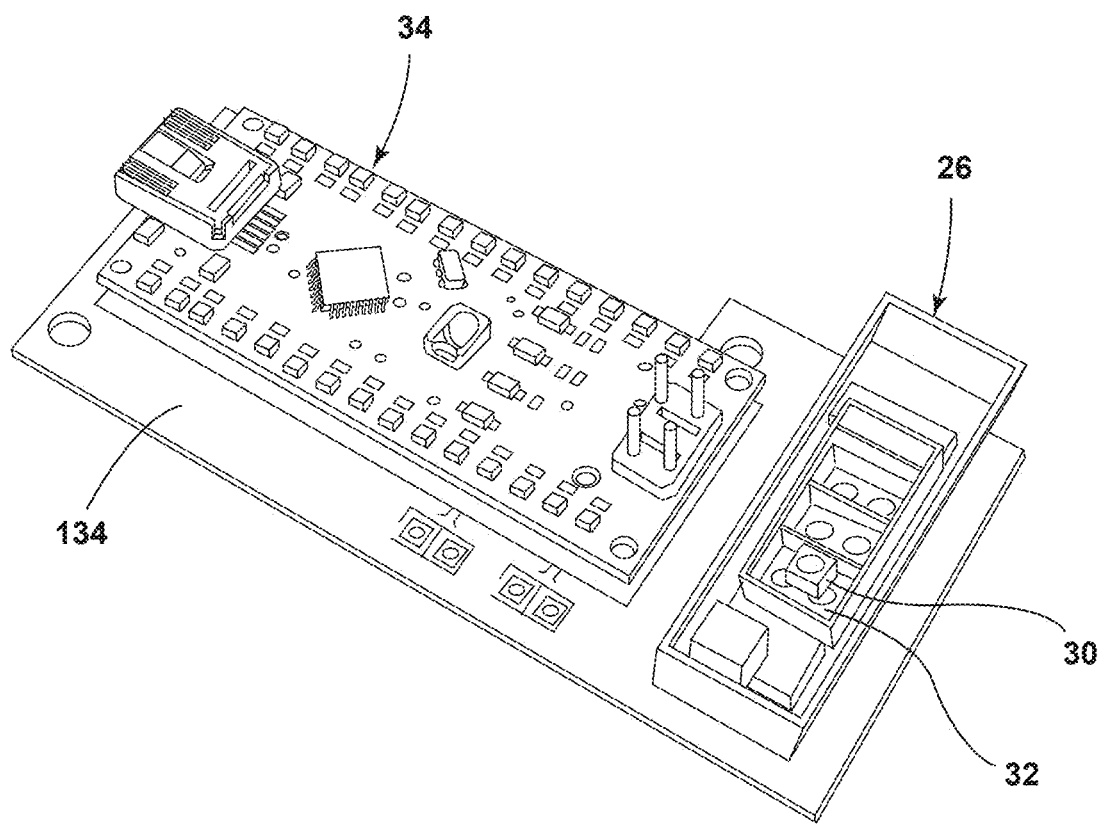
FIG. 8 is a top perspective view of a control assembly and a portion of a detection assembly for an air monitoring system, according to the present disclosure.

Alternatively, as illustrated in FIG. 8, the components of the detection assembly 26 and the control assembly 34 may be supported on a single support circuit board 134. This configuration may be advantageous for providing a more compact air monitoring system 10.

Figure 9:
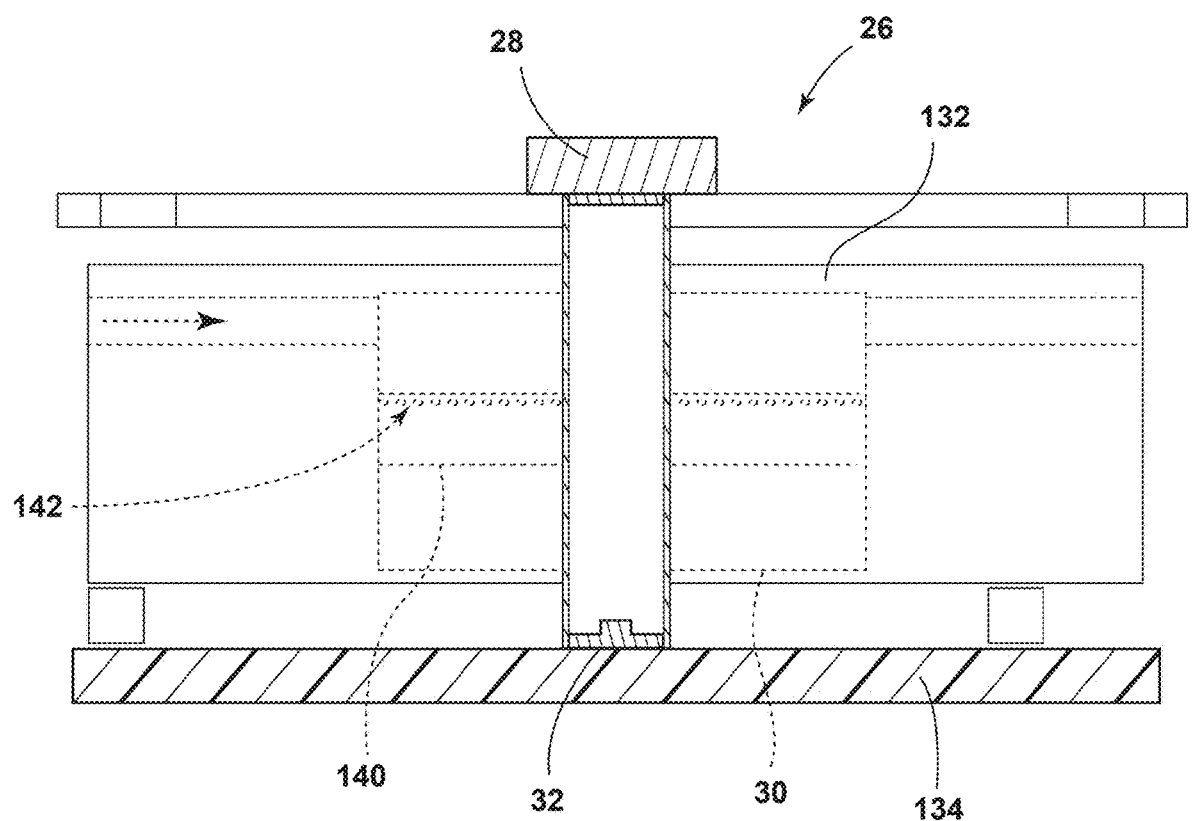
FIG. 9 is a schematic diagram of a biochip disposed between a light source and a photodetector in a detection assembly, according to the present disclosure.

Referring to FIG. 9, the detection assembly 26 includes the circuit board 134, the biochip 30, the light source 28, and the photodetector 32. The light source 28 is disposed on one side of the detection chamber 132 and aligned with the photodetector 32, which is coupled to an opposing side of the detection chamber 132 and supported by the circuit board 134. The biochip 30 is disposed between the light source 28 and the photodetector 32.

The light source 28 is configured to emit light and illuminate the biochip 30. The light source 28 is generally an LED configured to emit ultraviolet light, which has a wavelength from about 200 nm to about 400 nm. The illumination (e.g., light) from the light source 28 is detected or sensed by the photodetector 32. The detected light is quantified by the photocurrent of the photodetector 32. In certain aspects, the photodetector 32 is a complementary metal-oxide semiconductor (CMOS) photodetector 32 capable of detecting optical transmission and changes in the optical transmissions.

The biochip 30 has the optical transmission, which is an initial or default optical transmission for a "blank" or unbound biochip 30. The optical transmission of the biochip 30 is configured to change as the airborne particles engage the biochip 30 as described herein. The change in the optical transmission is detected as a change in the photocurrent of the photodetector 32.

Referring still to FIG. 9, the biochip 30 includes a reactive substrate including a hydrolayer 140 or photonic biogel 140 that incorporates biologically functional gold nanoparticles (AuNPs) 142 embedded therein. The AuNPs 142 serve as nanoprobes 142 capable of binding to specific airborne particles and microparticles in the air sample. For example, the nanoprobes 142 include chemical linkers that are configured to bind with specific airborne particles, such as viral particles or other pathogens. The nanoprobes 142 are constructed to bind to select particles, such that the nanoprobes 142 will not bind with other particles in the air.

In a specific non-limiting example, the nanoprobes 142 of the biochip 30 are configured to bind with SARS-CoV-2 virus particles. The biochip 30 includes plasmonic AuNPs 142 with an anti-glycoprotein configured to bind to a glycoprotein binding site of the SARS-CoV-2 viral particles. The bound nanoplasmonic S-protein changes the optical characteristics of the hydrolayer 140 of the biochip 30, which is utilized to detect the presence of the viral particles, the density of the viral particles in the air sample, and quantify a particle population. The biochip 30 may be configured to bind with a single type of particle, or alternatively, can include more than one type of nanoprobe 142 or a matrix of nanoprobes 142 to bind with more than one type of particle.

The detection assembly 26 utilizes the light and the photodetector 32 to sense the optical transmission of the biochip 30. The biochip 30 has the baseline optical transmission when unbound to the airborne particles. The optical transmission of the photonic biogel layer 140 is induced to change by the nanoprobe-virus or particle interactions.

Referring again to FIG. 6 and still to FIG. 9, the detection assembly 26 is configured to detect the optical transmission of the biochip 30, as well as changes to the optical transmission after the nanoprobes 142 bind with the airborne particles. The optical transmission of the biochip 30 is quantified as the photocurrent of the photodetector 32. As the optical transmission of the biochip 30 changes, the photocurrent of the photodetector 32 also changes. The photodetector 32 is configured to communicate the photocurrent to the sensor controller 94.

At least one of the sensor controller 94 and the primary controller 90 have routines 100 (e.g., algorithms or software) for monitoring the photocurrent of the photodetector 32 and comparing the photocurrent received from the photodetector 32 with stored information. In various aspects, the control assembly 34 stores a baseline photocurrent. The baseline photocurrent may be a value or range of values that correspond with the initial or default optical transmission of the "blank" biochip 30. The baseline photocurrent may be programmed into the control assembly 34. Additionally or alternatively, at the initial activation of the air monitoring system 10 and/or with each new biochip 30 inserted into the detection assembly 26, the detection assembly 26 may utilize the light source 28 and the photodetector 32 to obtain the baseline photocurrent.

The optical transmission change of the hydrogel layer 140 of the biochip 30 induced by the nanoprobe-particle interaction allows for the quantification of the airborne particles by the control assembly 34. During a detection phase of the air monitoring system 10, the light source 28 is configured to illuminate the biochip 30, and the change in the optical transmission can be measured and quantified as the change in the photocurrent by the photodetector 32. The measured change in the photocurrent $\Delta_1$ represents the density of the trapped airborne particles from the air sample collected by the airflow assembly 20. The changes in the photocurrent (e.g., electrical current) can be processed by the control assembly 34, which quantifies and assesses the change in the photocurrent $\Delta_1$ of the photodetector 32 relative to the baseline photocurrent $\Delta_0$ from the "blank" or unbound biochip 30. The photocurrent variation, quantified as $\Delta_1/\Delta_0$, of the photodetector 32 resulting from the optical transmission change is directly correlated with the airborne particle population. The airborne particle population is generally the airborne particles within the area surrounding the air monitoring system 10 from which the air sample was drawn. The particle population of the airborne particles in the environment surrounding the housing 12 is based on a difference between the photocurrent of the photodetector 32 and the baseline photocurrent stored in the controller 94.

Figure 10:
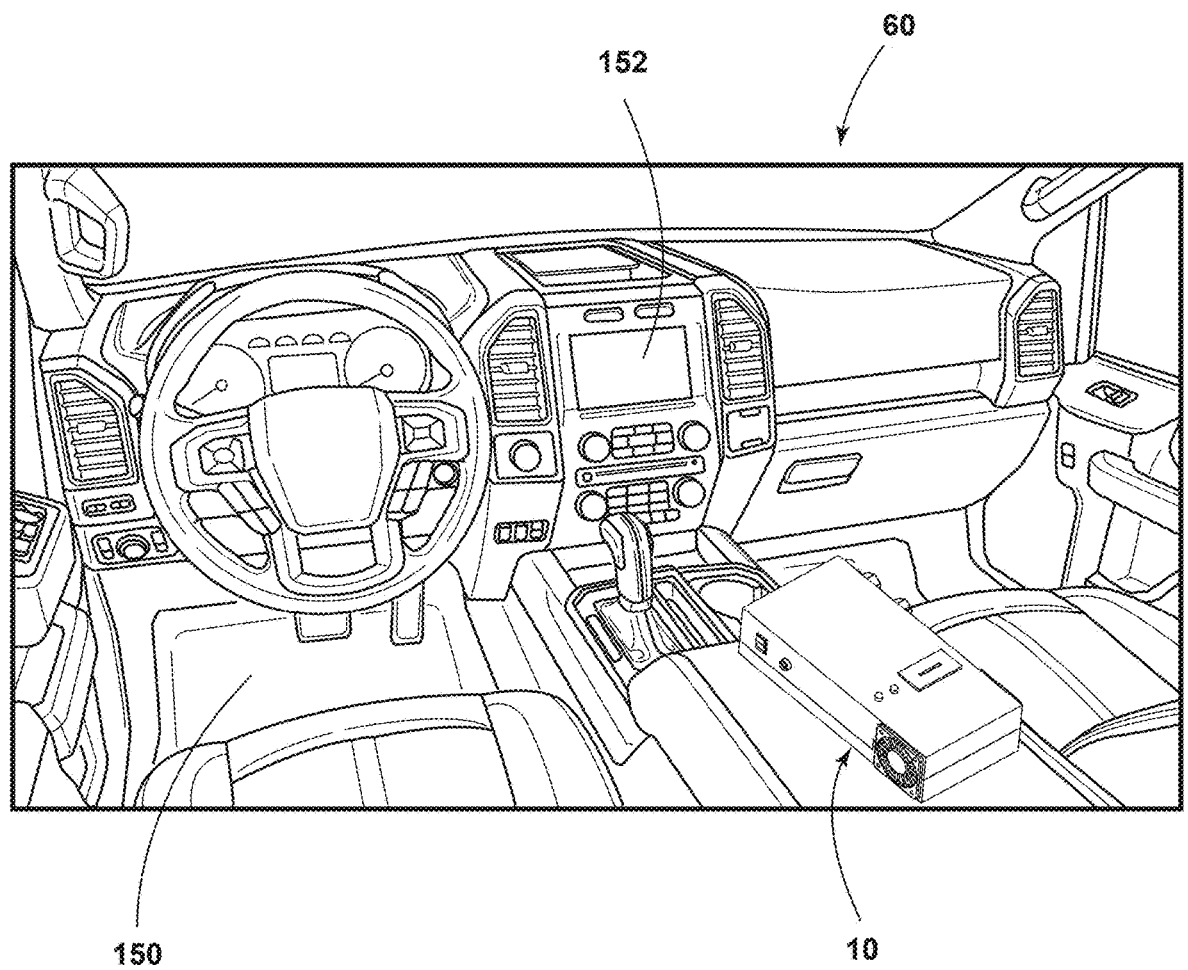
FIG. 10 is a partial side perspective view of a vehicle interior with an air monitoring system, according to the present disclosure.

The detection phase may be performed at intervals or continuously upon activation of the air monitoring system 10. In certain aspects, a new air sample may be drawn at predefined intervals, at predefined times, or in response to predefined events. For example, the air sample may be obtained upon activation of the vehicle 60 (FIG. 10). In another non-limiting example, when the air monitoring system 10 is used in the vehicle 60 used for ridesharing, the air sample may be obtained within a predefined time from each new occupant entering the vehicle 60. The air monitoring system 10 may enter the detection phase automatically or in response to an input by the user.

Referring to FIG. 10, the air monitoring system 10 is an integrated and self-contained system that can be installed in enclosed locations, such as within a passenger cabin 150 of the vehicle 60. The air monitoring system 10 may be disposed in any practicable location with the vehicle 60 to obtain the air sample of the air within the passenger cabin 150. The air monitoring system 10 may remain free of a wired connection with the vehicle 60, or alternatively may be electrically coupled to the vehicle 60 via wired connections.

Figure 11:
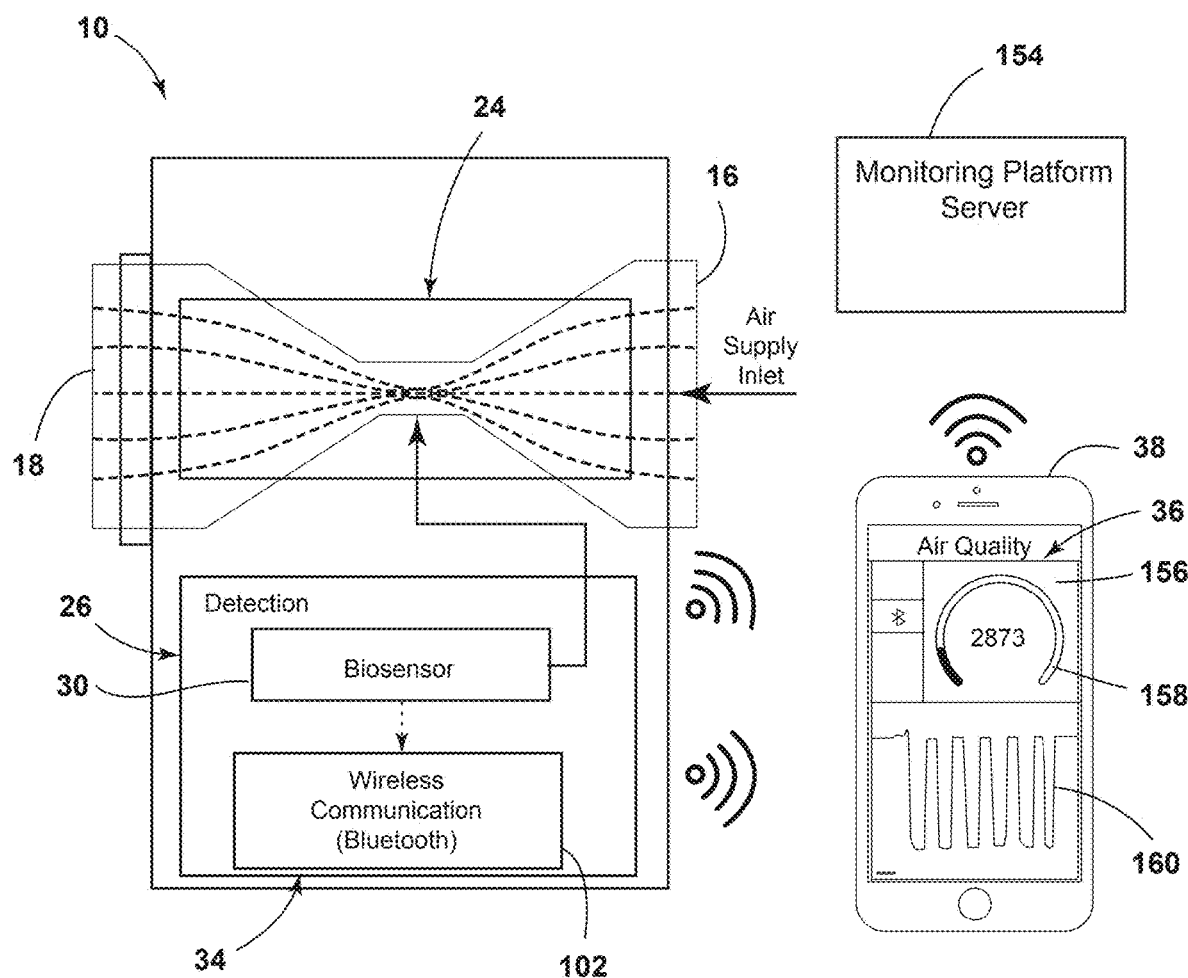
FIG. 11 is a block diagram of an air monitoring system within a vehicle in communication with a remote device and a server, according to the present disclosure.
Figure 12:
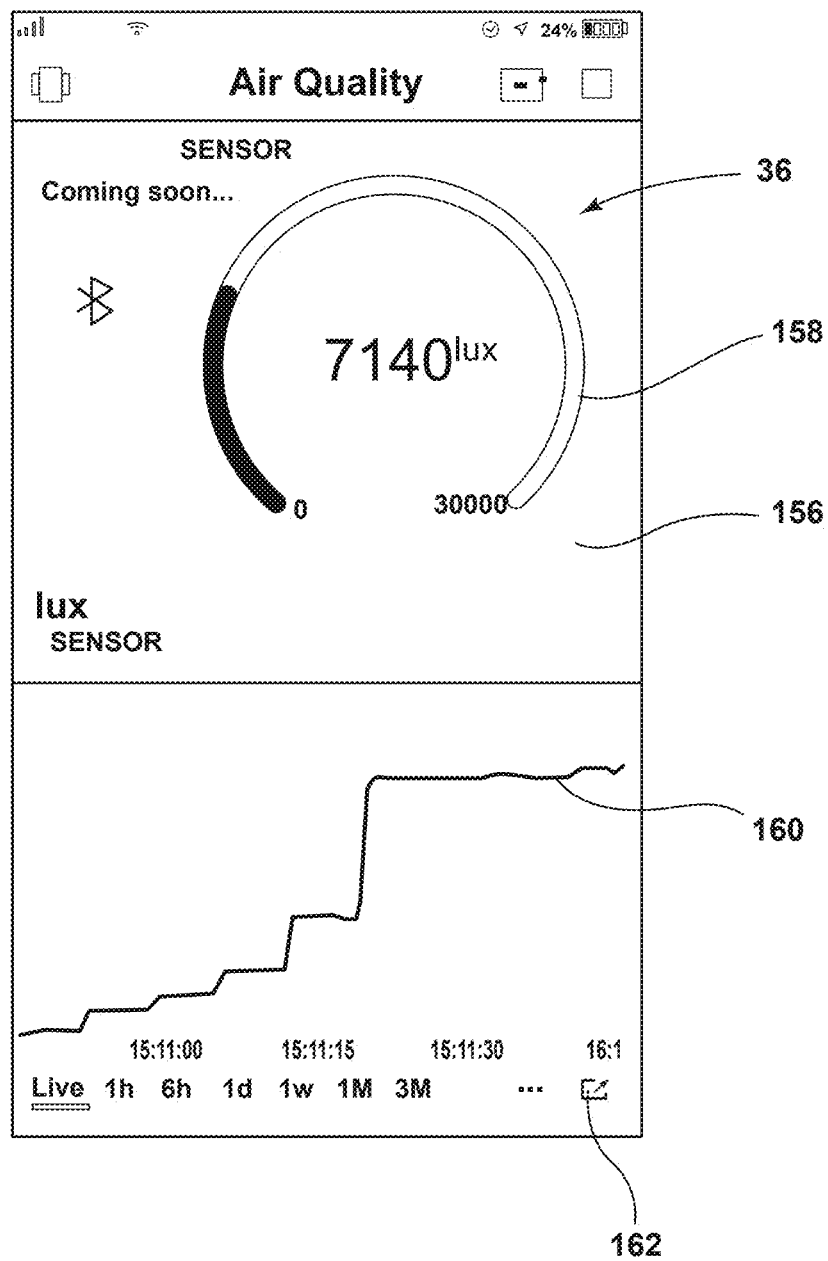
FIG. 12 is illustrative of a notification from an air monitoring system, according to the present disclosure.

Referring to FIGS. 11 and 12, the primary controller 90 includes the communication circuitry 102 configured for wired and/or wireless communication. Generally, the primary controller 90 includes the routines 100 (e.g., software application) configured to analyze and transmit the airborne particle data 36 in real-time to a remote or external device. In certain aspects, the primary controller 90 may be configured to communicate the airborne particle data 36 to a control module of the vehicle 60, such as via a CAN-LIN network of the vehicle 60. The airborne particle may then be displayed to the user in the vehicle 60, such as on an infotainment display 152.

Additionally or alternatively, the air monitoring system 10 may be configured to communicate wirelessly with the remote device 38. In such examples, the air monitoring system 10 may communicate via a wireless network, which may correspond to a variety of communication protocols configured to distribute data among various electronic devices. For example, the wireless network may include an IEEE 802.11 connection, an IEEE 802.15 connection, a Bluetooth® connection, a Wi-Fi connection, a WiMAX connection, cellular signal, signal using shared wireless access protocol cord axis (SWAP-CA), or any other type of radiofrequency or wireless signal. An IEEE 802.15 connection includes any wireless personal area networks (WPAN), such as ZigBee®, Z-wave®, Bluetooth®, UWB, and IrDA. In this way, the wireless network may provide for data communication between the air monitoring system 10 and the remote device 38.

The remote device 38 may be, for example, the vehicle 60, a phone, a tablet, a computer, a wearable device, or other electronic devices. In a non-limiting example, the air monitoring system 10 may be configured to communicate the airborne particle data 36 to the vehicle 60, via wired or wireless communication, and the control module of the vehicle 60 may be configured to communicate the airborne particle data 36 to the remote device 38. Alternatively, the air monitoring system 10 may communicate directly with the remote device 38.

One or both of the air monitoring system 10 and the remote device 38 may communicate with a server 154, generally via wireless communication. The server 154 generally includes a database for storing the particle data 36 from the air monitoring system 10. The server 154 includes a control unit having a processor, a memory, and other control circuitry, such as communication circuitry. Instructions or routines are stored in the memory and executable by the processor.

At least one of the air monitoring system 10 and the server 154 is configured to analyze the particle data 36 to indicate the presence or absence of the select airborne particles. The presence may be any detectable presence or a detectable presence above a predefined threshold. Upon detection of the select airborne particles, at least one of the air monitoring system 10 and the server 154 is configured to generate a notification 156 to indicate to the user that the select airborne particles have been detected. The notification 156 may include illumination of one of the indicator lights 70, 72, an alert on a display of the remote device 38, etc.

Referring still to FIGS. 11 and 12, the particle data 36 may be viewable in the notification 156 viewable on the remote device 38, illustrated as a phone in FIG. 11. The particle data 36 may include any data detected, processed, and/or analyzed by the air monitoring system 10 and/or the server 154. For example, as illustrated in FIG. 12, the particle data 36 includes an indicator 158 for the detected photocurrent from the photodetector 32. The indicator 158 may include numbers, graphics, text, etc. to indicate to the user the photocurrent detected by the photodetector 32 between zero and a maximum photocurrent value.

Additionally or alternatively, the notification 156 may include live or real-time monitoring of the detected photocurrent in a graphical representation 160. A line graph of the detected photocurrent over time may be generated and displayed in the notification 156. The notification 156 may also be configured to display historical graphical information, displaying the detected photocurrent over predefined times, such as hours, days, weeks, or months. The notification 156 may be generated and communicated after each detection phase to provide real-time results to the user.

The particle data 36 on the notification 156 may be exported to the server 154 or another location via an export icon 162. Additionally or alternatively, the particle data 36 may automatically be communicated to the server 154. The particle data 36 may also be sent, via the export icon 162 or automatically, to select end locations, which may be, for example, the server 154, health reporting services, employer health monitoring services, etc. The database of the particle data 36 may assist in monitoring changes of airborne particles over time, progression of concentration for monitoring and tracking exposure, etc.

Referring to FIGS. 1-12, the air monitoring system 10 is configured to collect, detect, and analyze air samples in real-time for select airborne particles, as well as report results within real-time. The monitoring performed in real-time generally refers to the air sample collection, diversion of the particles to the detection assembly 26, analysis within a predefined period of time, which may be minutes or seconds, and notification to the user. In this way, the air monitoring system 10 provides efficient detection and alerting of airborne particles in enclosed locations, such as within the vehicle 60.

In conventional methods, detection of airborne particles often utilizes polymerase chain reaction (PCR) analysis. This approach utilizes temperature management, as well as laboratory protocols for particle isolation, lysis, and removal of inhibiting materials. Other conventional methods utilize sample preparation such as high-temperature reaction control, handling aqueous-phase solutions, and equipment operations. The air monitoring system 10 disclosed herein provides real-time detection of the airborne particles from the air sample with the biochip 30.

The biochip 30 may include a matrix of nanoprobes 142 to bind to multiple airborne particles. Additionally or alternatively, the biochip 30 may be replaceable in the air monitoring system 10 once the airborne particle detection reaches a predefined threshold. This predefined threshold may indicate that a substantial amount of the nanoprobes 142 are bound to airborne particles and unable to bind to additional airborne particles. The air monitoring system 10 may include multiple biochips 30, with the same or different bioreactive layer 140, that can be on rollers or carriages to change the biochip 30 once the current biochip 30 reaches a predefined optical transmission indicative of bound nanoprobes 142 at a predefined threshold.

Referring still to FIGS. 1-12, the air monitoring system 10 may also be incorporated into the heating, ventilation, and air conditioning (HVAC) system of the vehicle 60 or other enclosed locations. In such examples, the airflow assembly 20 may draw the air sample from the HVAC system to collect the airborne particles. Additionally or alternatively, the HVAC system may direct the air sample to the airflow assembly 20 or the detection assembly 26 for particle collection. Generally, when integrated with the HVAC system, the air monitoring system 10 may be activated when the HVAC system is operating in a recirculation mode.

In certain aspects, the air monitoring system 10 may also be configured to detect airborne particles bound to the test strip sample 74, such as an antigen test strip. The test strip sample 74 may be placed in an environment with the particles to be detected, which may be in an aqueous solution. The test strip sample 74 may then be processed using the detection assembly 26 of the air monitoring system 10. The housing 12 defines the receiving slot 76, which is in communication with the detection assembly 26.

The detection assembly 26 may utilize the light source 28 and the photodetector 32 to detect the optical transmission of the test strip sample 74, similar to the detection with the biochip 30. The light source 28 illuminates the test strip sample 74 and the photocurrent detected by the photodetector 32 correlates to the optical transmission of the test strip sample 74. The photocurrent may be compared to a baseline photocurrent for the test strip. The baseline photocurrent may be a value or range of values that correspond with the initial or default optical transmission of the "blank" test strip. The baseline photocurrent may be programmed into the control assembly 34 or may be input through detection of the photocurrent on the "blank" test strip. The air monitoring system 10 may be configured to determine when the test strip sample 74 is being tested compared to the biochip 30, such as via a sensor or an input from the user. The photocurrent is indicative of the density of the trapped airborne particles on the test strip, which can be directly correlated with the particle population similar to the biochip 30.

Figure 13:
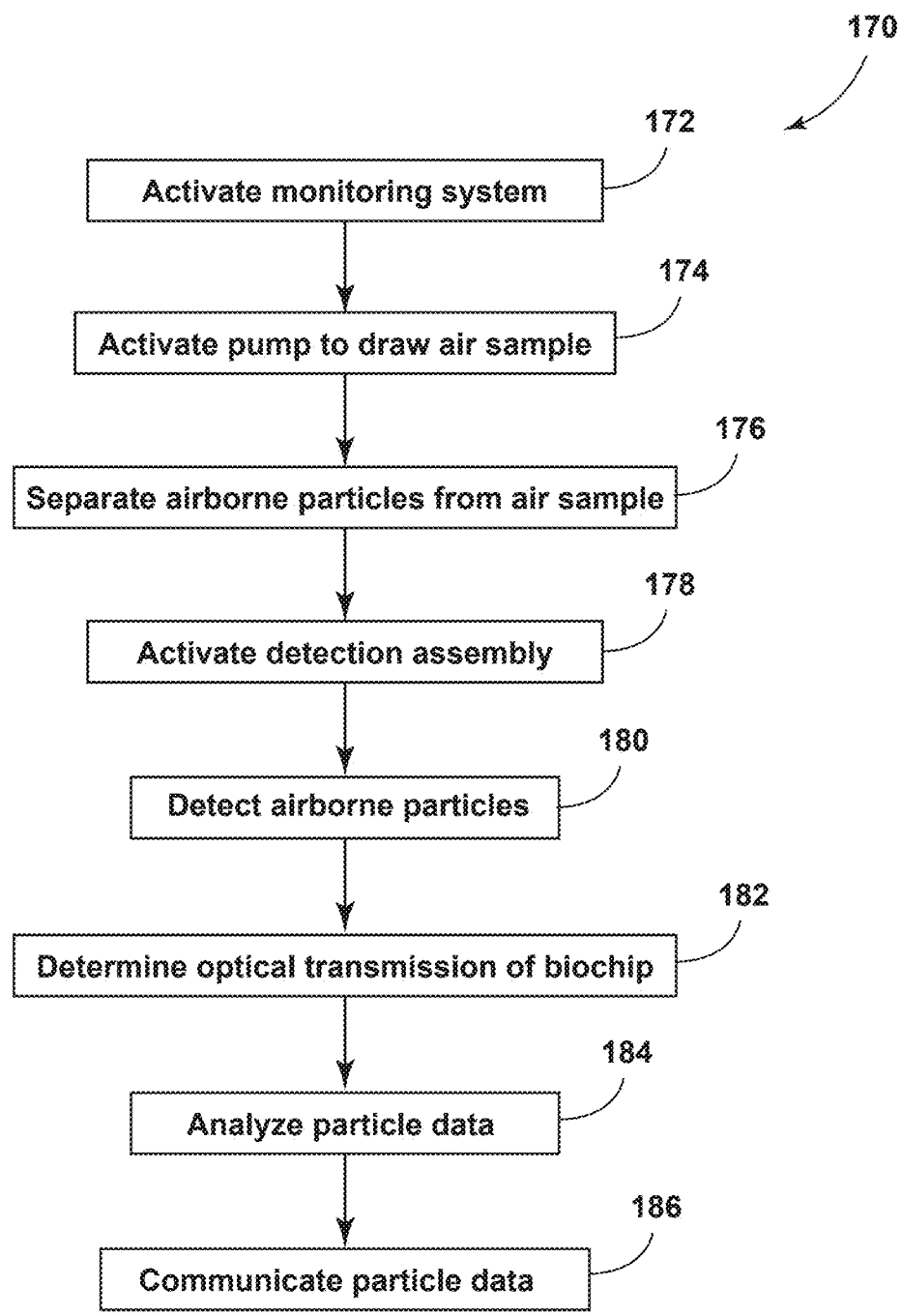
FIG. 13 is a flow diagram of a method for monitoring air within a vehicle, according to the present disclosure.

Referring to FIG. 13, as well as FIGS. 1-12, a method 170 of monitoring airborne particles includes positioning or installing the air monitoring system 10 in or in fluid communication with an enclosed location, such as within the passenger cabin 150 of the vehicle 60. In step 172, the air monitoring system 10 is activated. Upon activation, the air monitoring system 10 may determine the baseline photocurrent for the "blank" biochip 30 in the detection assembly 26. Additionally or alternatively, in step 172 if the initially detected photocurrent for the biochip 30 correlates to the optical transmission of the biochip 30 with a substantial portion of the nanoprobes 142 being bound, the air monitoring system 10 may change biochips 30 or alert the user, via the remote device 38 or the indicator lights 70, 72, of the bound biochip 30 to be replaced.

In step 174, the airflow assembly 20 is activated. The pump 22 is activated to draw the air sample into the conduit 110. Further, supplying the air sample to the airflow assembly 20 is generally configured to generate the negative pressure to induce the collection of the airborne particles. In step 176, the airborne particles are separated from the airflow assembly 20 and collected in collection unit 80 of the detection assembly 26. In step 178, the particles are directed toward the biochip 30 in the detection assembly 26.

In step 180, the air monitoring system 10 is configured to detect the optical transmission of the biochip 30. The select airborne particles in the detection assembly 26 are configured to be bound to the reactive substrate (e.g., the nanoprobes 142) of the biochip 30. If the particles are not the selected particles for which the biochip 30 includes the nanoprobes 142, the airborne particles will not bind to the biochip 30.

In step 182, the optical transmission of the biochip 30 is measured. As the particles bind to the biochip 30, the optical transmission of the biochip 30 changes, which is detected using the light source 28 and the photodetector 32. The optical transmission and the change of the optical transmission are measured as the photocurrent and the change in the photocurrent detected by the photodetector 32. In step 182, the test strip sample 74 may be received in the housing 12 for detection of the optical transmission of the test strip sample 74.

In step 184, the control assembly 34 is configured to process or analyze the change in the photocurrent detected by the photodetector 32. The control assembly 34 is configured to utilize the detected photocurrent to determine the density of the airborne particles within the air sample or on the test strip. Further, the control assembly 34 is configured to determine the change of the detected photocurrent compared to the baseline photocurrent, which correlates to the particle population within the enclosed location.

In step 186, the control assembly 34 is configured to communicate the airborne particle data 36 to one or both of the remote device 38 and the server 154. The particle data 36 may include the detected photocurrent, the change in photocurrent from the baseline photocurrent, the change in the photocurrent over a period of time, the density of the airborne particles in the air sample or on the test strip sample 74, calculated particle population, trends in the data, etc. Additional processing or analysis may be performed by the routines in the server 154, which may be communicated to the control assembly 34 of the air monitoring system 10 and/or the remote device 38. Further, in step 186, the particle data 36 may be further reported for monitoring and tracking exposure and detection. It is contemplated that the steps of the method 170 may be performed in any order, simultaneously, repeated, or omitted without departing from the teachings herein.

Use of the present device may provide a variety of advantages. For example, the air monitoring system 10 is a self-contained unit that may be installed in an enclosed space, such as the passenger cabin 150 of the vehicle 60. Additionally or alternatively, the air monitoring system 10 may be used with or integrated into the HVAC system. Further, the air monitoring system 10 is configured to collect and analyze air samples in real time to detect select airborne particles, such as viral particles, bacteria, other pathogens, etc. Also, the monitoring system is configured to collect the air sample and analyze the air sample within the integrated system without the use of additional aqueous solutions or laboratory equipment and conditions. Moreover, the air monitoring system 10 utilizes the biochip 30 to detect the presence and concentration of the airborne particles. Additionally, the air monitoring system 10 provides an efficient process for determining particle presence and concentration without utilizing PCR and other laboratory methods. In this way, the user may have real-time monitoring and tracking of airborne particle levels and particle exposure. Additional benefits or advantages may be realized and/or achieved.

According to various examples, a vehicle air monitoring system includes a housing defining an interior. The housing defines an inlet. An airflow assembly is disposed within the interior of the housing and includes a pump configured to draw an air sample into an airflow passage via the inlet. A detection assembly is in fluid communication with the airflow passage of the airflow assembly. The detection assembly includes a light source configured to illuminate a biochip and a photodetector configured to detect an optical transmission of the biochip based on a photocurrent of the photodetector. A control assembly is in communication with the airflow assembly and the detection assembly. The control assembly is configured to activate the pump to draw the air sample into the airflow passage, compare the photocurrent by the photodetector with a predefined baseline photocurrent to determine a change in the optical transmission of the biochip, and communicate particle data to a remote device. Embodiments of the present disclosure may include one or a combination of the following features:

- the light source is configured to emit light having a wavelength in a range from 200 nm to 400 nm;
- the detection assembly includes a collection unit having a microfluidic particle trapping chamber in fluid communication with the airflow passage;
- the particle data includes a change in the photocurrent of the photodetector over a period of time;
- the biochip includes a reactive substrate with nanoprobes configured to bind to the airborne particles, which changes the optical transmission of the biochip and, consequently, changes the photocurrent;
- the control assembly is configured to determine a density of the airborne particles in the air sample based on the change in the photocurrent by the photodetector; and
- the control assembly is configured to determine a particle population in an area surrounding the housing based on a photocurrent variation of the change in the photocurrent of the photodetector compared to a baseline photocurrent.

According to various examples, an air monitoring system for a vehicle includes a housing. An airflow assembly is disposed within the housing and is configured to draw an air sample into the housing via an inlet. A detection assembly is disposed within the housing and is in fluid communication with the airflow assembly. The detection assembly includes a biochip configured to bind to select airborne particles. The detection assembly includes a light source configured to illuminate the biochip and a photodetector. A photocurrent of the photodetector is configured to correspond with an optical transmission of the biochip. A controller is configured to monitor the change in the optical transmission of the biochip based on the change of the photocurrent of the photodetector to determine a presence of the select airborne particles within the air sample. Embodiments of the present disclosure may include one or a combination of the following features:

the controller is configured to determine a density of the airborne particles in the air sample based on the optical transmission of the biochip;

the light source is configured to emit near visible ultraviolet light;

the controller is configured to generate a notification with the photocurrent of the photodetector over a predefined period of time;

the controller is configured to generate the notification to include an indicator of the photocurrent relative to a maximum photocurrent;

the controller is configured to determine a particle population of the airborne particles in an environment surrounding the housing based on a difference between the photocurrent of the photodetector and a baseline photocurrent stored in the controller; and an indicator light configured to be activated by the controller in response to the presence of the select airborne particles.

According to various examples, a method of monitoring air within a vehicle includes drawing an air sample into a housing via a pump; separating airborne particles from the air sample, the airborne particles being directed to a detection assembly; illuminating a biochip of the detection assembly; determining an optical transmission of the biochip based on a photocurrent of a photodetector; determining particle data for the air sample based on the optical transmission; and monitoring a change in the optical transmission of the biochip based on a change in the photocurrent. Embodiments of the present disclosure may include one or a combination of the following features:

the step of separating the airborne particle from the air sample includes generating a negative pressure with the pump to drive the particle into a microfluidic particle trapping chamber;

the step of determining the particle data includes determining a density of the airborne particles in the air sample based on the change in the photocurrent and determining a particle population based on a change in the photocurrent relative to a baseline photocurrent;

changing the optical transmission of the biochip through an interaction between the biochip and the airborne particles; and the step of illuminating the biochip includes emitting light having a wavelength in a range from 200 nm to 400 nm through the biochip to the photodetector.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

The controllers and control units disclosed herein may include various types of control circuitry, digital or analog, and may each include the processor, a microcontroller, an application specific circuit (ASIC), or other circuitry configured to perform the various input or output, control, analysis, or other functions described herein. The memories described herein may be implemented in a variety of volatile and nonvolatile memory formats. Routines include operating instructions to enable various methods described herein.

It should be noted that the sensor examples discussed above might include computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Examples of the present disclosure may be implemented in further types of devices, as would be known to persons skilled in the relevant art(s).

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle air monitoring system, comprising:
   a housing defining an interior, wherein the housing defines an inlet;
   an airflow assembly disposed within the interior of the housing, wherein the airflow assembly includes a pump configured to draw an air sample into an airflow passage via the inlet and wherein the airflow assembly includes a conduit with a decreasing size to separate airborne particles from the air sample;
a detection assembly in fluid communication with the airflow passage of the airflow assembly to receive the airborne particles, wherein the detection assembly includes:
a biochip having a hydrolayer with inorganic nanoprobes embedded therein that include chemical linkers that bind with a binding site of select airborne particles from the air sample;
a light source on a first side of the biochip and configured to illuminate the biochip; and
a photodetector on a second opposing side of the biochip that is vertically aligned with the light source and configured to receive emitted light from the light source that is passed through the biochip, wherein received light is quantified as a photocurrent of the photodetector, and wherein bound nanoprobes change optical characteristics and, consequently, an optical transmission of the biochip for allowing transmission of the emitted light therethrough; and
a control assembly in communication with the airflow assembly and the detection assembly, wherein the control assembly is configured to:
activate the pump to draw the air sample into the airflow passage;
correlate the photocurrent of the photodetector to the optical transmission of the biochip for allowing transmission of the emitted light therethrough;
compare the photocurrent by the photodetector with a predefined baseline photocurrent to determine a change in the optical transmission of the biochip; and
communicate particle data to a remote device.

2. The vehicle air monitoring system of claim 1, wherein the light source is configured to emit light having a wavelength in a range from 200 nm to 400 nm.

3. The vehicle air monitoring system of claim 1, wherein the detection assembly includes a collection unit having a microfluidic particle trapping chamber in fluid communication with the airflow passage.

4. The vehicle air monitoring system of claim 1, wherein the particle data includes a change in the photocurrent of the photodetector over a period of time.

5. The vehicle air monitoring system of claim 1, wherein the housing defines a receiving slot for receiving a test strip sample into the detection assembly between the light source and the photodetector, and wherein the control assembly is configured to determine an optical transmission of the test strip sample by comparing the photocurrent of the photodetector to determine a baseline optical transmission for the test strip sample.

6. The vehicle air monitoring system of claim 1, wherein the control assembly is configured to determine a density of airborne particles in the air sample based on the change in the photocurrent by the photodetector.

7. The vehicle air monitoring system of claim 1, wherein the control assembly is configured to determine a particle population in an area surrounding the housing based on a photocurrent variation of the change in the photocurrent of the photodetector compared to the baseline photocurrent.

8. An air monitoring system for a vehicle, comprising:
a housing;
an airflow assembly disposed within the housing, wherein the airflow assembly is configured to draw an air sample into the housing via an inlet;
a detection assembly disposed within the housing and in fluid communication with the airflow assembly, wherein the detection assembly includes:
a biochip including a hydrolayer that incorporates inorganic biologically functional nanoparticles embedded therein, the inorganic biologically functional nanoparticles having chemical linkers that bind to binding sites of select airborne particles directly from the air sample, wherein bound airborne particles and nanoparticles change optical characteristics of the hydrolayer for transmission of light therethrough;
a light source configured to emit the light through the biochip; and
a photodetector, wherein the biochip is positioned directly between the light source and the photodetector, a photocurrent of the photodetector configured to correspond with an optical transmission of the biochip, wherein the photocurrent changes in response to the change in the optical characteristics caused by the bound nanoparticles; and
a controller configured to monitor a change in the optical transmission of the biochip based on the change of the photocurrent of the photodetector to determine a presence and a density of the select airborne particles within the air sample.

9. The air monitoring system of claim 8, wherein the controller is configured to determine a density of the airborne particles in the air sample based on the optical transmission of the biochip.

10. The air monitoring system of claim 8, wherein the light source is configured to emit light having a wavelength between 200 nm and about 400 nm.

11. The air monitoring system of claim 8, wherein the controller is configured to generate a notification with the photocurrent of the photodetector over a predefined period of time.

12. The air monitoring system of claim 11, wherein the controller is configured to generate the notification to include an indicator of the photocurrent relative to a maximum photocurrent.

13. The air monitoring system of claim 8, wherein the controller is configured to determine a particle population of the airborne particles in an environment surrounding the housing based on a difference between the photocurrent of the photodetector and a baseline photocurrent stored in the controller.

14. The air monitoring system of claim 8, further comprising:
an indicator light configured to be activated by the controller in response to the presence of the select airborne particles.

15. A method of monitoring air within a vehicle, comprising:
drawing an air sample through a conduit that has at least a portion with a smaller diameter and into a housing via a pump;
separating airborne particles from the air sample by creating a pressure differential, the airborne particles being directed into a connecting conduit that extends away from the conduit at the portion with the smaller diameter and to a detection assembly;
illuminating a biochip of the detection assembly;
binding select airborne particles directly from the air sample with chemical linkers of plasmonic nanoprobe embedded in a hydrolayer of the biochip;

changing an optical characteristic of the hydrolayer with bound nanoprobes;

determining an optical transmission of the biochip based on a photocurrent of a photodetector from illumination through the biochip;

determining particle data for the air sample based on the optical transmission, and monitoring a change in the optical transmission of the biochip based on a change in the photocurrent.

16. The method of claim 15, wherein the step of separating the airborne particle from the air sample includes generating a negative pressure with the pump to drive the particle into a microfluidic particle trapping chamber.

17. The method of claim 15, wherein the step of determining the particle data includes determining a density of the airborne particles in the air sample based on the change in the photocurrent and determining a particle population based on the change in the photocurrent relative to a baseline photocurrent.

18. The method of claim 15, wherein the step of illuminating the biochip includes emitting light having a wavelength in a range from 200 nm to 400 nm through the biochip to the photodetector.

19. The vehicle air monitoring system of claim 1, wherein the nanoprobes are plasmonic biologically functional gold nanoparticles with an anti-glycoprotein that binds to a glycoprotein binding site of the select airborne particles.

20. The vehicle air monitoring system of claim 1, further comprising:

a retaining wall disposed between the airflow assembly and the detection assembly and defining an aperture, wherein the airflow assembly includes a connecting conduit that extends away from the conduit, and wherein the connecting conduit is in fluid communication with the detection assembly via the aperture.

* * * * *